United States Patent Office.

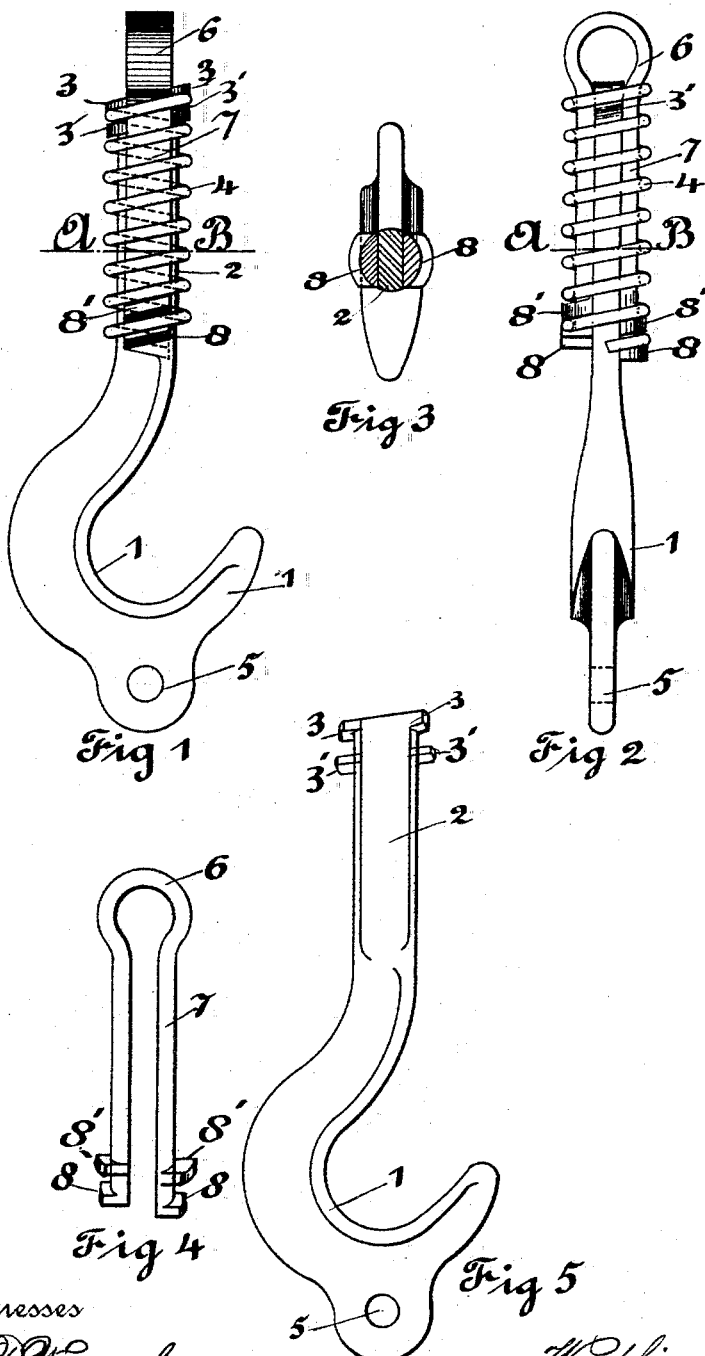

WATKIN H. WILLIAMS, OF INDIANAPOLIS, INDIANA.

YIELDING SHACKLE.

SPECIFICATION forming part of Letters Patent No. 497,936, dated May 23, 1893.

Application filed January 17, 1893. Serial No. 458,730. (No model.)

*To all whom it may concern:*

Be it known that I, WATKIN H. WILLIAMS, a citizen of the United States, residing at Indianapolis, in the county of Marion and State of Indiana, have invented new and useful Improvements in Yielding Shackles, of which the following is a specification.

My invention relates to a new and improved yielding shackle for use particularly in connection with the hauling and gripping apparatus employed for transporting beef and hogs through the various departments of the abattoir or pork packing establishments to undergo the various stages of dressing preparatory to marketing them, and will be hereinafter described.

The object of my invention is to provide a hook-shackle that will yield slightly but sufficiently to prevent shock or jar to the member of the dead animal to which it is attached which would dislocate such member from the main trunk and thereby depreciate the value of such animal as an article of commerce; and also to provide a yielding shackle that will be simple and durable in its construction. I attain these objects by means of the shackle illustrated in the accompanying drawings in which similar numbers of reference designate like parts throughout the several views.

Figure 1. is a side elevation of the shackle. Fig. 2. is an end elevation of the same. Fig. 3. is a transverse section through the line A—B, see Figs. 1. and 2. Fig. 4. is a detail view of the bifurcated or sliding link of the shackle, and Fig. 5. is a detail view of the hook or suspension piece of the shackle.

The shackle is composed of a suspension or main hook 1. formed integral with its stem 2. which has the spring engaging toes 3. formed on its end, said toes turned outwardly and with their faces in a plane at right angles with and inclined with the axis of the shackle to correspond with the inclination or helix of the coils of the compression spring 4.

On the bottom or turn of the hook 1. is formed the eye 5. which I employ for the purpose of connecting the shackle with the hauling cable or chain. The hog chain and hook, or chain for gripping the limb of the animal to be hauled is connected with the loop end 6. of the shackle said loop 6, having its sides or legs 7. prolonged parallel and between which the stem 2. of the hook is adapted to loosely fit and to slide longitudinally, said legs 7 provided with the opposite and outwardly projecting spring engaging toes 8. which are also perpendicular to the axis of the shackle and coincide with an inclined plane corresponding with the helical coils of the compression spring 4.

The manner of connecting the different parts of the shackle with the compression spring to form a yielding shackle is as follows:—The hooked portion and the stem 2. of the shackle are first constructed in one integral part, and the spring 4. is then applied endwise to the end of the stem 2. with the end toes 3. entered between the first and second coils of the said spring which is now rotated till the stem 2. has passed through the center or core of the compression spring 4. and till the outer toes 3. engage the end or outer portion of the end coil of the compression spring. Additional spring engaging toes 3' are used for the purpose of reinforcing the end toes when subjected to severe stress. The legs 7. of the loop or clevis 6. are next pushed endwise on the flat sides of the stem 2. over which they loosely fit, till the end toes 8. enter the space between the first and second coils of the opposite end of the compression spring 4. The spring 4. itself is now rotated on the stem 2. till its toes 8. and the entire length of the legs 7. have traversed longitudinally along the axis of the spring 4. into the position shown in Fig. 1. The inner or intermediate toes 8' are also formed on the legs 7. for the purpose of reinforcing the toes 8. It will at once be seen on inspecting the drawings that, the toes 3. and 8. of the separate pieces composing the shackle, engage the compression spring 4. at opposite ends, thereby compressing it and permitting said parts of the shackle to yield or give when subjected to a sudden strain or shock.

Having thus fully described the nature and construction of my invention, what I claim as new and useful, and desire to cover by Letters Patent of the United States therefor, is—

1. In a yielding shackle or link, the combination with a hooked piece having a prolonged stem, of a clevis or bifurcated piece having parallel prolonged legs or bifurcations adapted to receive loosely and to slide longitudinally on the opposite sides of said stem, and a suitable spring surrounding said stem and legs; said spring connected at its opposite ends to the ends of said stem and clevis legs, substantially as set forth.

2. In a yielding shackle or link, the combination with a hooked piece having a prolonged stem, of a clevis or bifurcated piece having parallel prolonged legs or bifurcations adapted to loosely receive and to slide longitudinally on said stem, a suitable coiled spring surrounding said stem and sliding legs, and suitable outwardly projecting toes formed on the ends of said stem and said legs, and adapted to engage the opposite ends of said spring, substantially as set forth.

3. In a yielding shackle or link, the combination with a hooked piece having a prolonged stem, the opposite sides of which are parallel, of a clevis or bifurcated piece, having parallel prolonged legs adapted to loosely receive and to slide longitudinally over the opposite flat sides of said stem, and a suitable spring of a resilient material surrounding said stem and the legs of said clevis and suitable lugs or toes projecting outwardly on the ends and at the opposite sides of the said stem and legs both of which engage the opposite ends of said spring, substantially as and for the purpose set forth.

4. In a yielding shackle or link, the combination with a hooked piece having a prolonged stem two of the opposite sides of which are flat and parallel and two parallel and convex, of a clevis or bifurcated piece having parallel legs prolonged longitudinally, said legs having their outer convex surfaces joining the opposite convex sides of said stem to continue the round or form a round shaft, and having inner parallel flat surfaces adapted to loosely receive and to slide longitudinally over and along the flat sides of said stem, a spring surrounding said stem and legs, and outwardly projecting toes or lugs formed on opposite sides and on the ends of the said stem and legs and having their spring engaging faces inclined to correspond with the inclination of the coils of said spring, said toes adapted to pass between said coils, and suitable means whereby the shackle may be hitched to the load and its hoisting chain, substantially as and for the purposes set forth.

In testimony whereof I have hereunto set my hand in the presence of two subscribing witnesses.

WATKIN H. WILLIAMS.

Witnesses:
THOMPSON R. BELL,
BERTHA E. WILLIAMS.